(12) United States Patent
Pearce

(10) Patent No.: X6055
(45) Date of Patent: Jun. 30, 1830

(54) SPINING MACHINE

(76) Inventor: John Pearce

John Pearce, of Yorkshire, N. York.
Letters Patent

The schedule referred to in these Letters Patent and making part of the same containing a description in the words of the said John Pearce himself, of his improvement in the machine for spinning wool called the Farmers handy maid.

---

To all persons to whom these presents shall come, John Pearce of the town of Yorkshire, in the County of Cataraugus in the State of New York, sends Greeting.
Be it known that I, the said John Pearce, have invented a new and useful improvement, not used or known before, in the spinning of wool called the Farmers handy maid, which invention & the manner of using it is as follows. . . –
This improvement is a machine to be employed in spinning wool, and is intended for the use of families and small manufacturing establishments, and is made & moved as follows – the frame is 4 posts of about 2 feet 7 inches in length, 2 inches wide, & 1½ inch thick. 2 plates are then put on to the posts of about 3 feet 3 inches in length and of the size of the posts. A rail way is then attached to the inside of the posts for the purpose of moving a part of the machine on, of 7 or 8 feet long & 1½ inch thick & 3 inches wide, with legs or posts at the hind end to steady the frame; the posts are framed in to the plates about 6 inches apart near the forward end of the rail way; the frame is united by 4 girts which are framed in to the posts, and the upper girt forms the under part of the jaw which is matched to the upper jaw to hold the rolls while they are twisting. The upper jaw projects 2 inches over the left side of the frame to receive a piece of timber connected with a lever to move a cog pulley into contact with a cog roller that brings forward the feeding cloth. The cog roller lies on the plates about 1 inch forward of the jaws said pulley & roller are on a shaft or axletree. At the fore end of the rail way is a second roller placed on the top of the rail way. Around these 2 rollers is put the feeding cloth with a board between them to support the cloth and strengthen the frame. The board is fastened to 2 braces that go from the fore end of the rail way to the front posts. Above the cog roller is a 3d. roller for the purpose of holding the rolls whilst the jaws are raised and the rolls are passing through. The upper jaw is raised by 2 levers fastened on the inside of the plates or posts.

In the jaws are 2 pins which come in contact with the fore ends of 2 levers - -
On the under side of the levers are shoulders which come in contact with 2 pieces
on the outside of the posts of the moving carriage, and as the carriage approaches
the jaw, the upper jaw raises and is held by 2 triggers that are fastened to 2 short
posts on the top of the plates. Said triggers catch on the hind end of the levers.
Upon the left hand plate is a slide secured by opposite pieces, at the fore end of
said slide is attached a cord that runs to the fore end of the frame with a
weight on the end. Said cord goes round the cog pulley & serves to bring forward
the roll carriage by an arm attached to the moving carriage, and when said
carriage is drawn back it comes in contact with the triggers and disengages
them from the levers & the jaw closes on the rolls.
The rail way is about 15 inches from the floor and is grooved for the carriage
to run on. The construction of the carriage is as follows, the sides are about
2½ feet long, 2 inches wide & 1¼ thick; 2 girts, and moves on 4 wheels attached
to the carriage sides. The wheels are about 3 inches diameter and one of the
above girts about 2 feet long and projects over the right side of the carriage
about 10 inches, said girt lies in an inclined form towards the jaw on which
the foot of the spindles and shaft stands, with the tops inclined toward the jaw.
There are 3 posts standing in an inclined form towards the jaws. Into 2 of
them are framed a girt to hold the spindles in a proper position, and 2
arms are attached to the said posts to hold the roller that contains the
gudgeons, to guide the yarn on to the spindles, and another arm is attached
to the left hand post that pulls into the slide, as above mentioned.
On the posts are 2 pieces placed with holes in them, with moveable pins in
them to alter the size of the yarn, and also to come in contact with the pins
in the triggers that hold the levers that raise the jaw, whilst the rolls pass
through. There braces from the sides of the carriage to the posts. -
Near the top of the posts on the right hand side of the carriage on the
projecting girt stands a shaft in an inclined form towards the jaws, on
or near the bottom of which is a pulley around which is the band.
From thence it goes to the spindles, which are about 2½ inches distance
from each other. and the whirls are about 1 inch in diameter, at the top of
the right hand post is a girt that holds the top of the shaft, about 4 inches above the last mentioned post is another post, about 10 inches long, on the top of said posts, on which is a horizontal shaft, on one end of which is a cog wheel about 7 inches in diame-ter, that works into the last mentioned cog wheel. And on the other end of said shaft is a crank about 8 inches long, the turning of which puts the spindles in motion. -
On the carriage sides are placed 2 posts which support a reel of sufficient length to reel as many skeins as there are spindles.
The above description and size are for 8 spindles, but the principles contained in the machine may be increased or diminished to any size desired, by observing the same proportion and making the machine wider or narrower, you can alter your number of spindles - In witness whereof, I hereunto subscribed my name, the first day of June 1830.

Witnesses
L. H. Pitcher
Elijah Wood

John Pearce

Exd.
[illegible]